(12) United States Patent
Ellman et al.

(10) Patent No.: US 6,384,352 B1
(45) Date of Patent: May 7, 2002

(54) AIR SENSITIVE USER INPUT DEVICES

(76) Inventors: Steven Ellman, 1672 E. 7th St., Brooklyn, NY (US) 11230; Lawrence Mass, 5 Berkeley La., Rye Brook, NY (US) 10573; Fredric Ellman, 30 Fairview Ave., Tarrytown, NY (US) 10591; Julius Ellman, 1672 E. 7th St., Brooklyn, NY (US) 11230

( * ) Notice: Subject to any disclaimer, the term of this patent is extended or adjusted under 35 U.S.C. 154(b) by 0 days.

(21) Appl. No.: 09/560,075

(22) Filed: Apr. 27, 2000

Related U.S. Application Data
(60) Provisional application No. 60/131,452, filed on Apr. 28, 1999.

(51) Int. Cl.$^7$ ............................................. H01H 35/90
(52) U.S. Cl. ............................. 200/81.9 R; 200/81.9 M
(58) Field of Search ...................... 200/81 R, 81.9 R, 200/81.9 M

(56) References Cited

U.S. PATENT DOCUMENTS

| | | | | |
|---|---|---|---|---|
| 2,600,011 A | * | 6/1952 | MacDonald et al. | ....... 200/81.9 |
| 2,882,364 A | * | 4/1959 | Warren | ........................ 200/80 |
| 4,119,819 A | * | 10/1978 | McGuire | ............... 200/81.9 R |
| 4,725,700 A | * | 2/1988 | Zoludow | ............... 200/81.9 R |
| 5,762,554 A | | 6/1998 | Siu | .............................. 463/37 |
| 5,829,745 A | | 11/1998 | Houle | .................... 273/148 B |
| 5,860,607 A | | 1/1999 | Irwin | .......................... 241/80 |

FOREIGN PATENT DOCUMENTS

JP  63270518-a  * 4/1987 ........... B01D/46/42

* cited by examiner

*Primary Examiner*—Michael Friedhofer
(74) *Attorney, Agent, or Firm*—Paul J. Sutton

(57) ABSTRACT

An air sensitive input device is capable of use in a variety of environments which include, without limitation, toys, computer and video games, consumer appliances, musical instruments, and devices which assist the disabled. A housing having an intake port and an exhaust port includes therein a switching mechanism configured to change between open and closed positions in response to air flow entering the intake port.

9 Claims, 6 Drawing Sheets

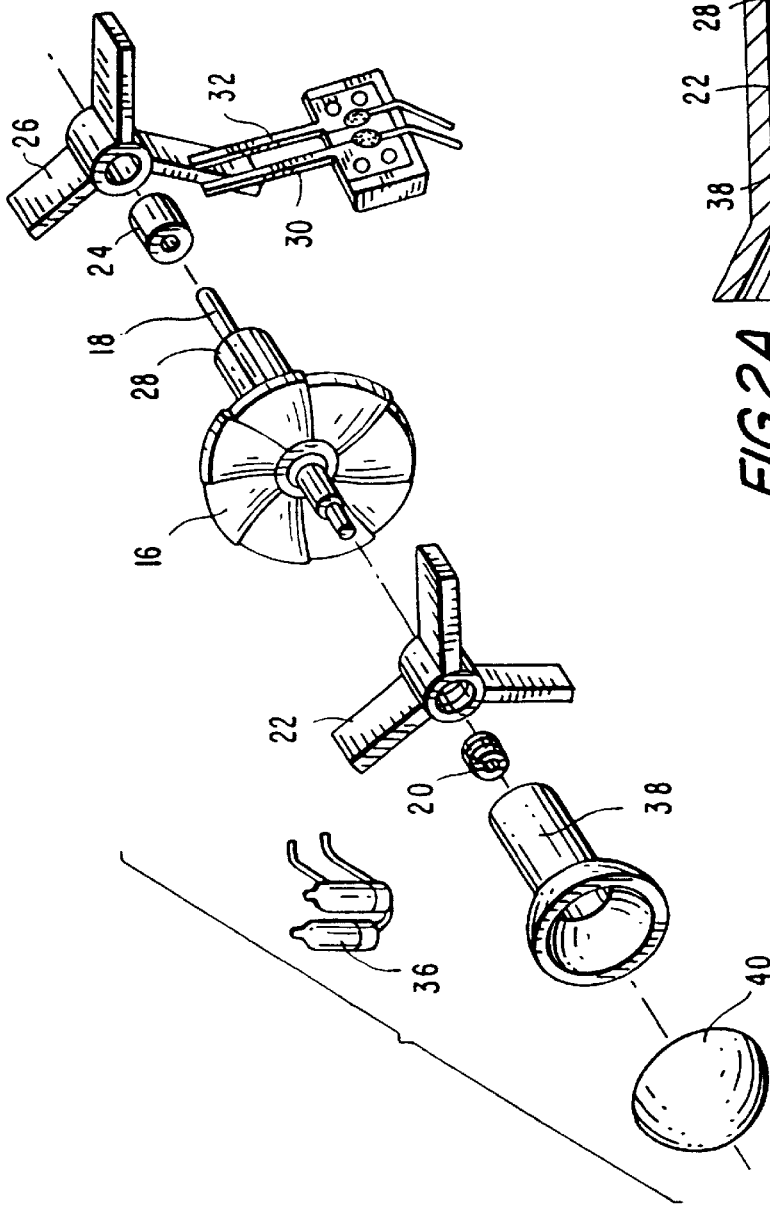
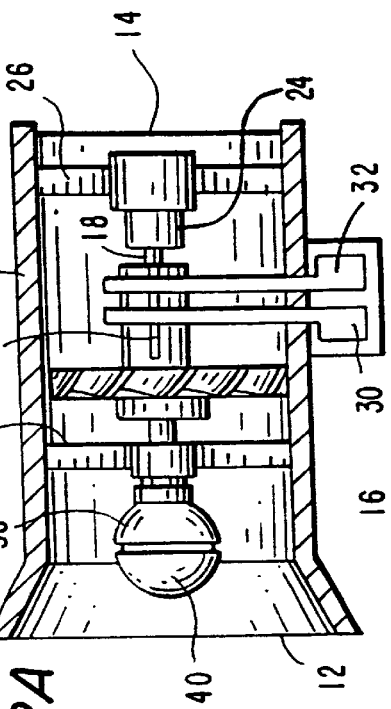
FIG. 2
FIG. 2A

AIR SENSITIVE USER INPUT DEVICES

This application claims priority pursuant to 35 U.S.C. 119(e) from provisional application No. 60/131,452, filed on Apr. 28, 1999, which will be abandoned on Apr. 28, 2000 in favor of the present application.

BACKGROUND OF THE INVENTION

The present application relates to an air sensitive user input device that is responsive to airflow through the device. For example, the device is responsive to air passing through the device, e.g., a puff of air, or airflow created within the device when the device is moved through the air. The air sensitive input device according to the present application can be used in a wide variety of applications. Examples of the applications contemplated include: toys, computer and video games, consumer appliances and musical instruments.

BRIEF DESCRIPTION OF THE DRAWINGS

Embodiments of the present application are described herein with reference to the drawings, wherein:

FIG. 2 is an exploded view of the air sensitive user input device of FIG. 1;

DETAILED DESCRIPTION OF THE DRAWINGS

Figure 1:
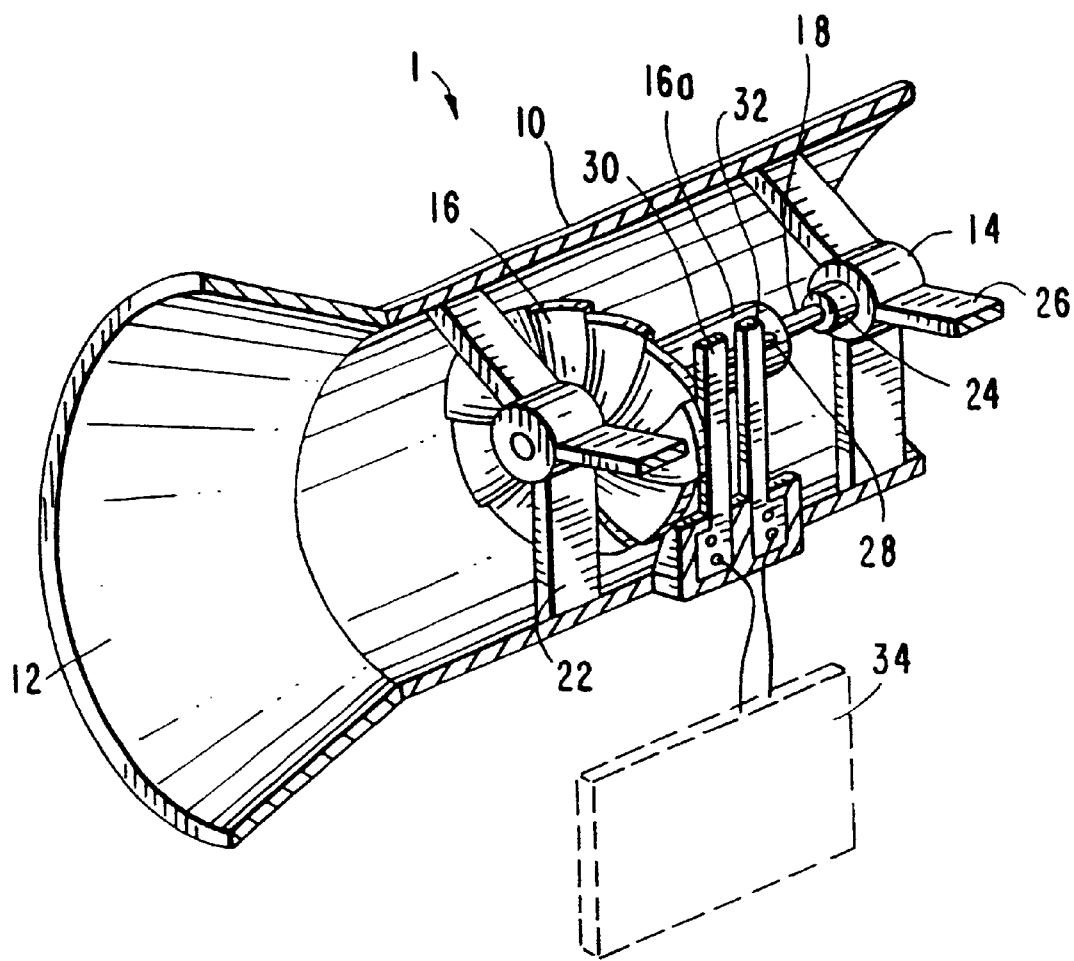
FIG. 1 is a perspective view in partial cross-section of an exemplary embodiment of the air sensitive user input device according to the present application.

Generally, the air sensitive user input device includes a housing 10 having an air intake port 12 and an exhaust port 14. Between the two ports is a fan 16 mounted to a shaft 18. The shaft 18 is rotatably secured in the housing via front pivot 20 mounted in front support 22 and rear pivot 24 mounted in rear support 26. A rearward side of the fan has an elongated portion 16a. At least one electrically conductive strip 28 is secured to or molded into the elongated portion 16a of the fan 16. Contacts 30 and 32 are positioned relative to the elongated portion 16a of the fan 16 so that each time the fan rotates approximately 360° the conductive strip 28 engages each contact 30 and 32, creating a conductive path between the contacts. In the embodiment of FIGS. 1 and 2, the contacts 30 and 32 and the conductive strip 28 form a switching mechanism. However, other types of switching mechanisms are also contemplated by the present application. For example, optical, magnetic and solid state switching mechanisms can be used.

In operation, air that passes from the intake port 12 to the exhaust port 14 causes the fan 16 to rotate. Rotation of the fan causes, at a predetermined point, the conductive strip 28 to engage each contact 30 and 32 thereby closing, the switching mechanism so that current can flow from one contact to the other. By closing the switching mechanism, a controller 34 connected to the switching mechanism can be activated to perform one or more application functions. The controller 34 is preferably a programmable device that is capable of performing various tasks in accordance with program instructions. A microprocessor and supporting hardware provide a suitable controller. Alternatively, the controller can be a hardwired device that responds to input signals to perform the various application functions. A state machine is a suitable hardwired controller. Examples of application functions activated by the controller include: 1) causing light bulb 36 in light housing 38 to illuminate so that the light is visible through domed face 40 (FIG. 2); 2) controlling items displayed by a video game system, such as causing movement of game players or causing game effects to occur, e.g., weapons to fire or wind to blow; 3) opening or closing of toy parts to reveal hidden items, e.g. a "pop up" feature in a jack-in-the-boxtoy; 4) movement of toy body parts e.g., an arm or a leg, in an action figure; and 5) lighting g of a bulb o r sounding of a horn in a toy vehicle.

The controller 34 can also be configured to respond to different rates at which the switch mechanism activates. For example, if airflow through the device is light, so that the rotation rate of the fan 16 is below a first predefined value, the controller can provide a first response. If the airflow through the device is at an intermediate level, so that the rotation rate of the fan 16 is between the first predefined value and a second predefined value, the controller can provide a second response. If the airflow through the device is strong so that the rotation rate of the fan 16 is greater than the second predefined value, the controller can provide a third or more responses.

Figure 3:
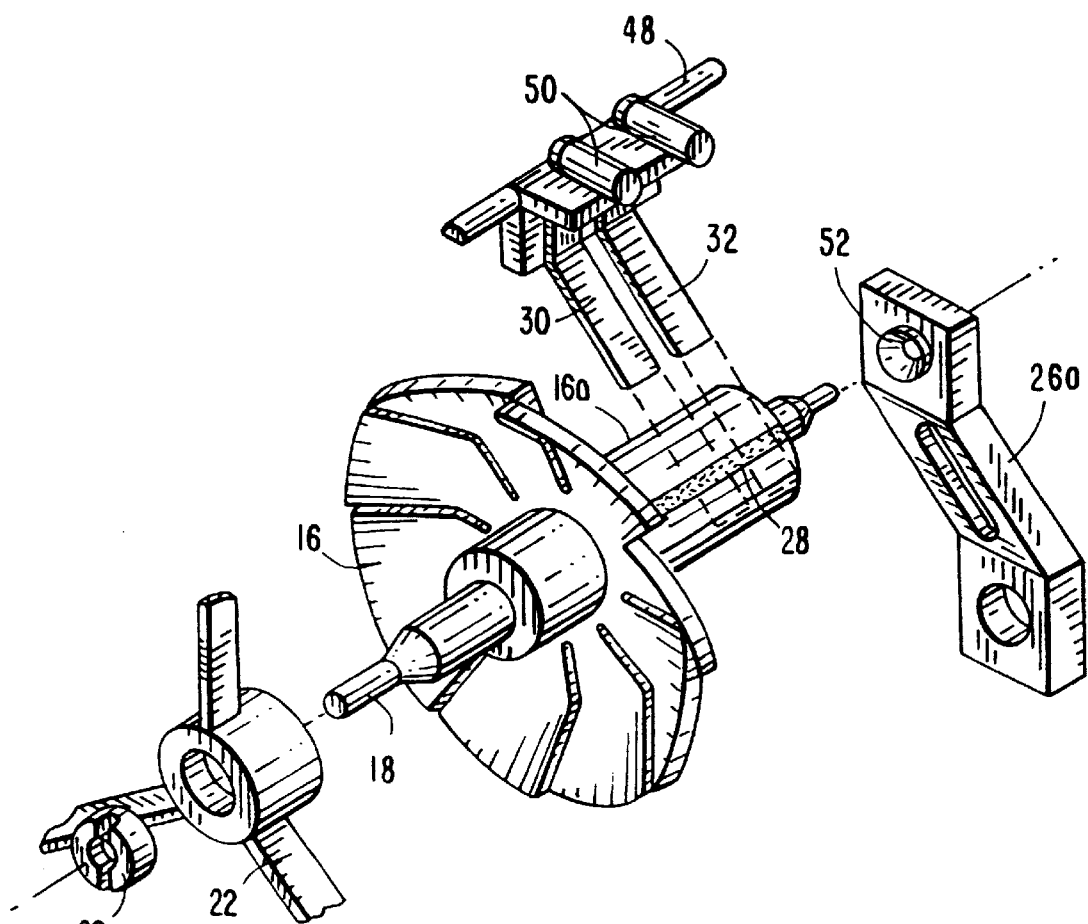
FIG. 3 is an exploded view of a portion of the air sensitive input device, illustrating an alternative embodiment for the switching mechanism.

In the switching mechanism embodiment of FIG. 3, contacts 30 and 32 are secured to pivot arm 48. The pivot arm 48 is mounted in housing 10 (FIG. 1) so that contacts 30 and 32 can be pivoted in a direction towards conductive strip 28. In this embodiment, the pivoting direction is counter-clockwise. Counter weights 50 are provided to normally pivot the contacts 30 and 32 toward the conductive strip 28. In this embodiment, rear support 26 is replaced with rear support 26a, which includes a nylon cup 52 to support the back portion of shaft 18.

Figure 4:
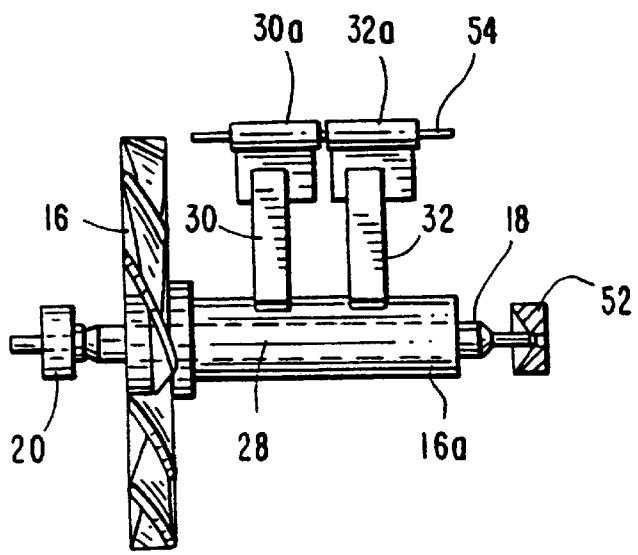
FIG. 4 is a side view of an alternative embodiment of the switching mechanism for the air sensitive user input device.

In the embodiments of FIG. 4, another alternative embodiment of the switching mechanism is shown. In this embodiment, each contact 30 and 32 is mounted to a contact support 30a and 32a, respectively. Each contact support 30a and 32a is rotatably mounted to shaft 54 so that the contact support, and thus the contact, can independently pivot (or rotate) relative to the shaft. Each contact support 30a and 32a can be made of insulating material or electrically conductive material. If contact supports 30a and 32a are made of electrically conductive material, shaft 54 is preferably made of an insulating material.

Figure 5:
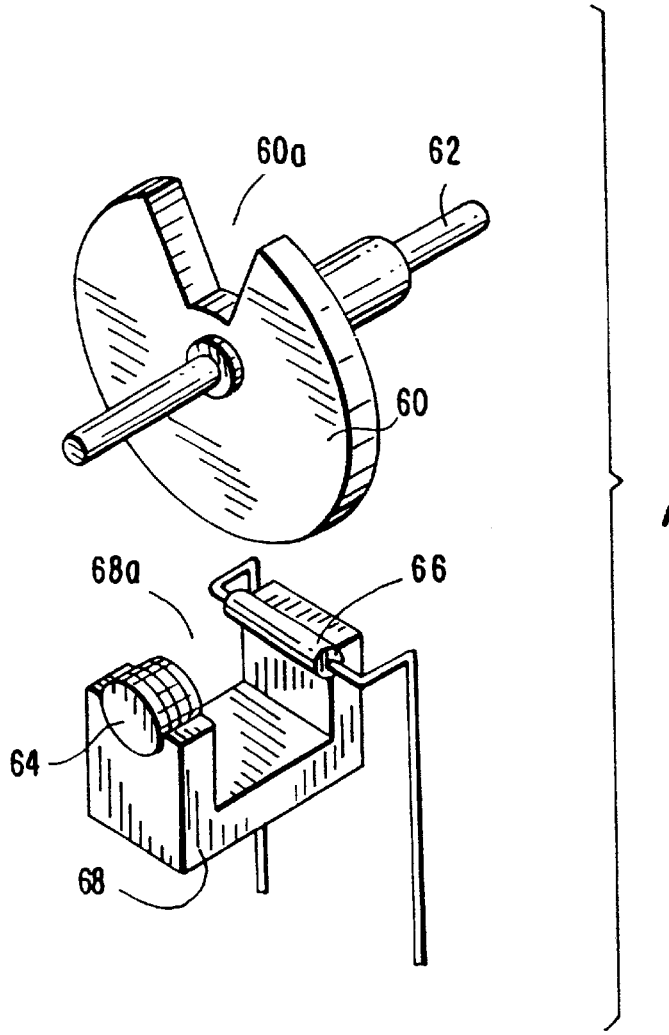
FIG. 5 is a perspective view of another alternative embodiment of the switching mechanism for the air sensitive user input device.

In the embodiments of FIGS. 1–4, the switching mechanism consisted of conductive strip 28 and contacts 30 and 32, in various configurations. In FIG. 5, another alternative switching mechanism is shown. In this exemplary embodiment, the switching mechanism includes a disc 60 having a window 60a, which disc is attached to an axle 62 (or shaft 18) (FIGS. 1–4), a magnet 64 and a reed switch 66. The magnet 64 and reed switch 66 are attached to opposite sides of bracket 68, as seen in FIG. 5, so that the magnetic field of the magnet causes the reed switch to either open or close. The disc 60 is positioned relative to the bracket so that a portion of the disc 60 rotates in the channel 68a between the magnet 64 and the reed switch 66. Preferably, the disc 60 is made of a material capable of dampening or obstructing the magnetic field, such as steel.

In operation, when the disc 60 is in the channel 68a, the magnetic field generated by the magnet is prevented from acting on the reed switch 66, so the switch is in either an open or closed state. When the window 60a passes through the channel 68a, the magnetic field is not obstructed by the disc 60 so that the field acts on the reed switch 66, causing the switch to either close or open depending upon the original state of the reed switch.

Figure 6:
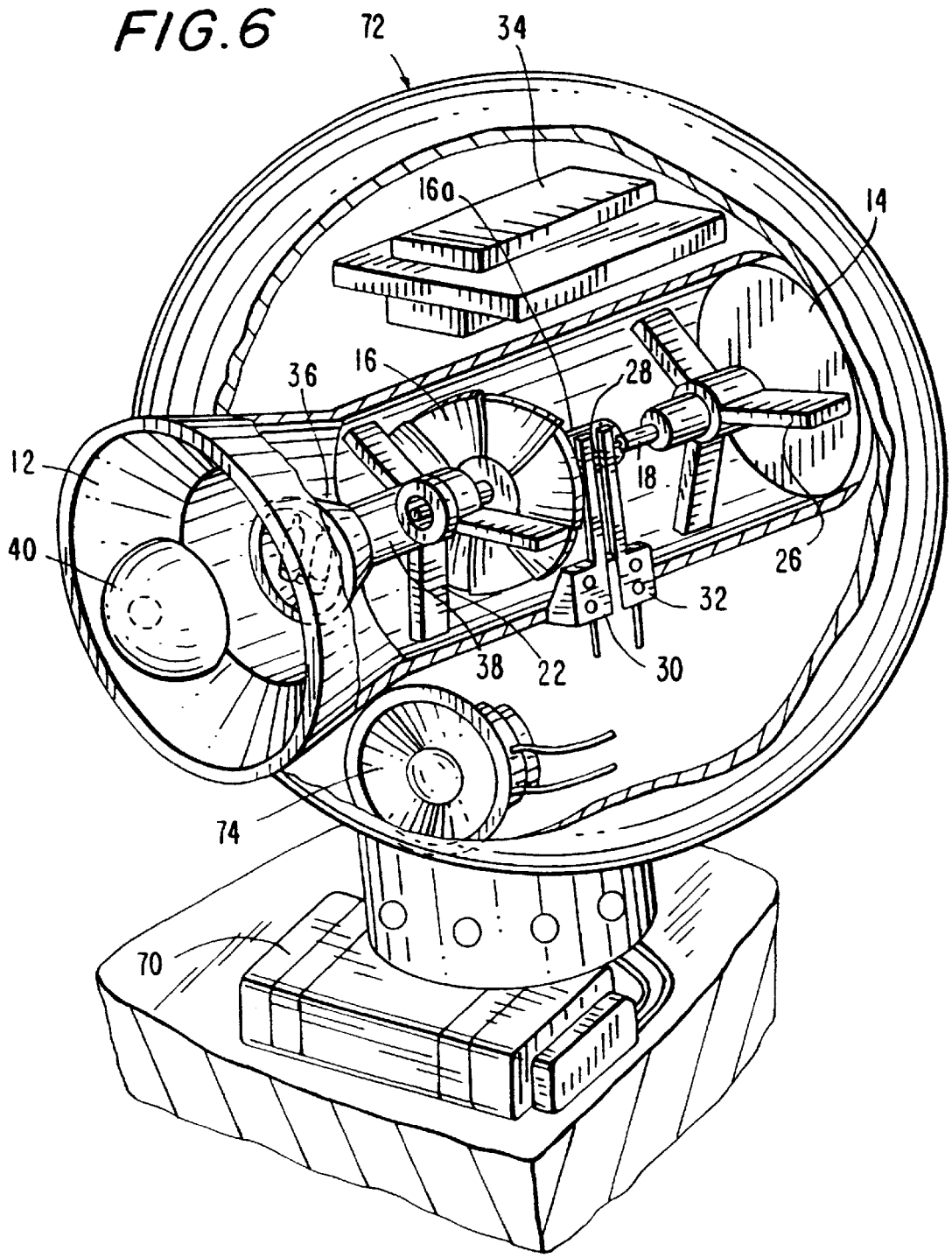
FIG. 6 is a perspective view of a toy incorporating the air sensitive user input device of the present application.

In FIG. 6, an exemplary embodiment for a toy application of the air sensitive user input device is shown. In this embodiment the toy includes a base 70, capable of storing a battery, and an outer shell 72. The shell 72 can be in various shapes. Examples of shapes of the shell include: animals, toy characters, "action" figures, vehicles and artificial flowers. The air sensitive user input device is located within the shell so that intake part 12 and exhaust part 14 are accessible from an outer surface of the shell. The controller 34 is located within the shell 72, however it is within the scope of the present invention to provide the controller located in the base 70. As noted, the controller 34 is provided to activate various predefined application functions, which in the embodiment of FIG. 6 includes lighting bulbs 36 and/or providing an audible message via speaker 74, upon activation of the switching mechanism.

Figure 7:
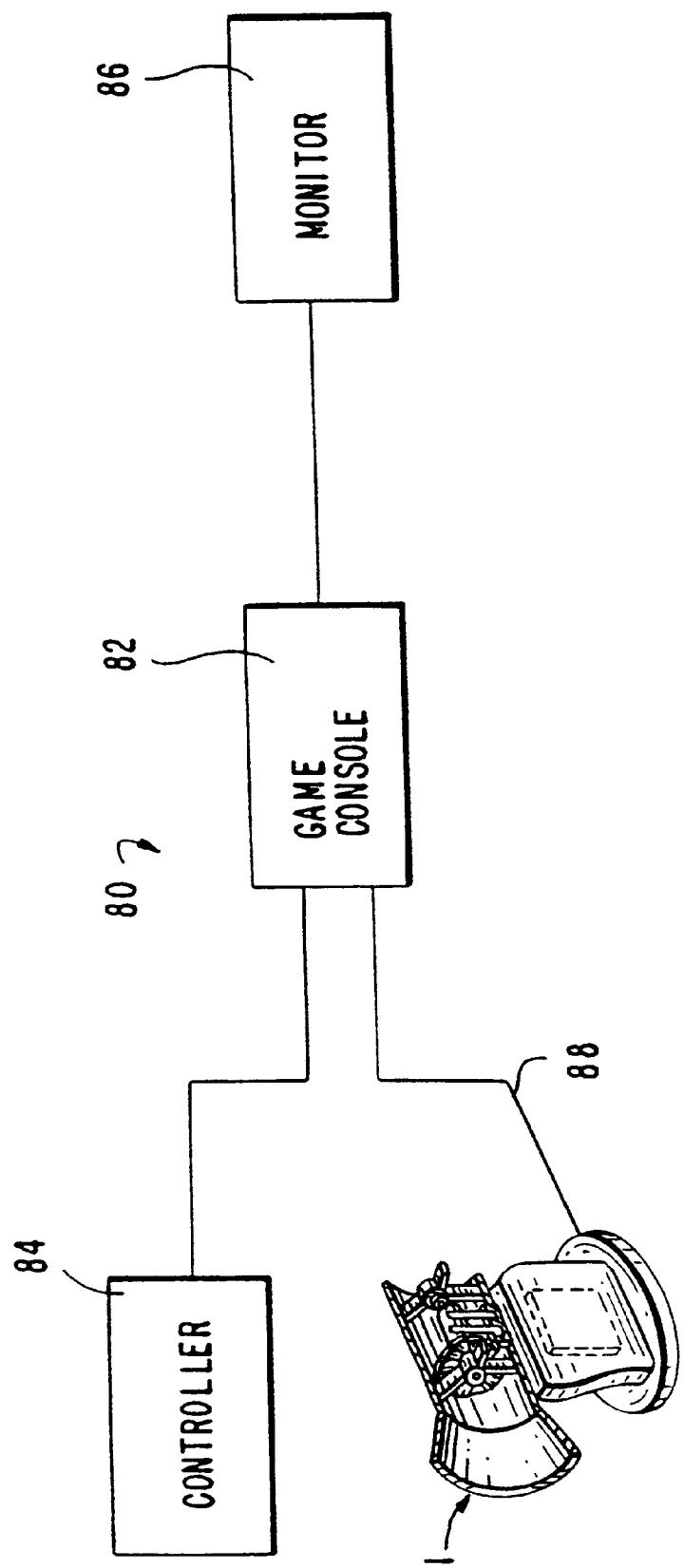
FIG. 7 is a block diagram of a video game system incorporating the air sensitive user input device of the present application.

In FIG. 7, an exemplary embodiment for a video game system 80 is shown. Typically, a video game system 80 includes a game console 82 and one or more controllers 84 used to control features of a game generated by console 82. The game console 82 is connected to a monitor 86, such as a television or computer monitor to display the game being played. Examples of video game systems are Sony Playstation and Nintendo 64. In this embodiment, the air sensitive user input device 1 can be configured to send control information to the game console via direct wire 88 or via wireless data transmission techniques using infra-red or RF signals. In this embodiment, the air sensitive user input device 1 can be used, for example, to control movements of players in the video game, or to impose effects, such as wind, into the game.

In the embodiments of FIGS. 6 and 7, as well as any other application of the air sensitive user input device, the strength of airflow through the device can be used to provide different responses for different application functions, as for example, described above.

What is claimed is:

1. An air sensitive input device comprising:
   a housing having an intake port and an exhaust port; and
   a switching mechanism positioned within the housing and configured to change between open and closed positions in response to air flow from the intake port to the exhaust port,
   wherein the switching mechanism comprises:
      a disc having a window connected to a portion of a fan, such that rotation of the fan causes rotation of the disc;
      a bracket having a channel located within the housing, such that at least a portion of the disc rotates within the channel;
      a magnet secured to the bracket on one side of the channel; and
      a switch secured to the bracket on another side of the channel, the switch being responsive to a magnetic field from the magnet, wherein the disc prevents the magnetic field from affecting the switch and the window permits the magnetic field to affect the switch.

2. The air sensitive input device according to claim 1, wherein the switching mechanism comprises:
   the fan positioned within the housing between the intake and exhaust ports, the fan being rotated in response to air flow from the intake port to the exhaust port;
   a conductive member associated with the fan, such that rotation of the fan causes movement of the conductive member; and
   at least two contacts positioned adjacent the fan, such that, when the fan is rotating, the conductive member periodically contacts each of the at least two contacts so as to permit electrical current to flow from one contact to another.

3. The air sensitive input device according to claim 1, further comprising a controller coupled to the switching mechanism and responsive to activation of the switching mechanism.

4. An air sensitive input device comprising:
   a housing having an intake port and an exhaust port; and
   a switching mechanism positioned within the housing and configured to change between open and closed positions in response to air flow from the intake port to the exhaust port,
   wherein the switching mechanism comprises:
      a rotatable disc;
      a bracket having a channel located within the housing, such that at least a portion of the rotatable disc rotates within the channel;
      a magnet secured to the bracket on one side of the channel; and
      a switch secured to the bracket on another side of the channel, the switch being responsive to a magnetic field from the magnet, wherein the disc prevents the magnetic field from affecting the switch.

5. The air sensitive input device according to claim 4, wherein the rotatable disc includes a window which permits the magnetic field to affect the switch.

6. The air sensitive input device according to claim 4, wherein the switching mechanism comprises:
   a fan positioned within the housing between the intake and exhaust ports, the fan being rotated in response to air flow from the intake port to the exhaust port, with rotation of the fan causing rotation of the rotatable disc;
   a conductive member associated with the fan, such that rotation of the fan causes movement of the conductive member; and
   at least two contacts positioned adjacent the fan, such that, when the fan is rotating, the conductive member periodically contacts each of the at least two contacts so as to permit electrical current to flow from one contact to another.

7. The air sensitive input device according to claim 6, wherein the rotatable disc includes a window connected to a portion of the fan, such that rotation of the fan causes rotation of the rotatable disc.

8. The air sensitive input device according to claim 7, wherein the window of the rotatable disc permits the magnetic field to affect the switch.

9. The air sensitive input device according to claim 4, further comprising a controller coupled to the switching mechanism and responsive to activation of the switching mechanism.

* * * * *